United States Patent
Cezanne et al.

(10) Patent No.: US 10,911,128 B2
(45) Date of Patent: *Feb. 2, 2021

(54) TECHNIQUES FOR BEAM DISCOVERY AND BEAMFORMING IN WIRELESS COMMUNICATIONS

(71) Applicant: QUALCOMM Incorporated, San Diego, CA (US)

(72) Inventors: Juergen Cezanne, Ocean Township, NJ (US); Tianyang Bai, Bridgewater, NJ (US); Sundar Subramanian, San Diego, CA (US); Vasanthan Raghavan, West Windsor Township, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/729,005

(22) Filed: Dec. 27, 2019

(65) Prior Publication Data

US 2020/0136713 A1    Apr. 30, 2020

Related U.S. Application Data

(63) Continuation of application No. 15/915,755, filed on Mar. 8, 2018, now Pat. No. 10,536,209.

(Continued)

(51) Int. Cl.
*H04B 7/06* (2006.01)
*H04B 7/0426* (2017.01)

(52) U.S. Cl.
CPC .......... *H04B 7/0695* (2013.01); *H04B 7/043* (2013.01); *H04B 7/0617* (2013.01); *H04B 7/0626* (2013.01)

(58) Field of Classification Search
CPC .. H04B 7/0626; H04B 7/0695; H04B 7/0617; H04B 7/0413; H04B 7/0452
(Continued)

(56) References Cited

U.S. PATENT DOCUMENTS

| 9,609,564 B2 | 3/2017 | Davydov et al. |
| 10,536,209 B2 * | 1/2020 | Cezanne ............. H04B 7/0626 |

(Continued)

FOREIGN PATENT DOCUMENTS

WO    2016163842 A1    10/2016

OTHER PUBLICATIONS

International Search Report and Written Opinion—PCT/US2018/021865—ISA/EPO—dated Jun. 18, 2018.
(Continued)

*Primary Examiner* — Emmanuel Bayard
(74) *Attorney, Agent, or Firm* — Arent Fox LLP

(57) ABSTRACT

Various aspects described herein relate to techniques for beam discovery and beamforming in wireless communications (e.g., 5th Generation (5G) New Radio (NR)). In an aspect, a method related to signaling for channel state information reference signals (CSI-RSs) in wireless communications is provided. The method includes receiving, by a user equipment (UE), a CSI-RS beam of a set of CSI-RS beams, and the CSI-RS beam includes a change indication message. The method further includes determining, by the UE, whether the set of CSI-RS beams have changed based on a value of the change indication message.

30 Claims, 4 Drawing Sheets

Related U.S. Application Data

(60) Provisional application No. 62/476,537, filed on Mar. 24, 2017.

(58) Field of Classification Search
USPC .................................. 375/267, 299, 347, 349
See application file for complete search history.

(56) References Cited

U.S. PATENT DOCUMENTS

| | | | |
|---|---|---|---|
| 2013/0051321 A1 | 2/2013 | Barbieri et al. | |
| 2013/0287064 A1 | 10/2013 | Seo et al. | |
| 2013/0308607 A1 | 11/2013 | Abe et al. | |
| 2014/0119325 A1 | 5/2014 | Xia et al. | |
| 2014/0233466 A1 | 8/2014 | Pourahmadi et al. | |
| 2015/0010099 A1 | 1/2015 | Lin et al. | |
| 2015/0358093 A1 | 12/2015 | Seo et al. | |
| 2016/0066209 A1 | 3/2016 | Lin | |
| 2016/0112173 A1 | 4/2016 | Wang et al. | |
| 2016/0261315 A1 | 9/2016 | Fujishiro | |
| 2016/0277954 A1* | 9/2016 | Frenne | H04W 72/082 |
| 2017/0264415 A1 | 9/2017 | Wiberg et al. | |
| 2018/0006706 A1 | 1/2018 | Cheng et al. | |
| 2018/0054797 A1 | 2/2018 | Islam et al. | |
| 2018/0115357 A1 | 4/2018 | Park et al. | |
| 2018/0192432 A1 | 7/2018 | Tenny et al. | |
| 2018/0205440 A1 | 7/2018 | Enescu et al. | |
| 2018/0212800 A1* | 7/2018 | Park | H04L 5/0057 |
| 2018/0227035 A1 | 8/2018 | Cheng et al. | |
| 2018/0279284 A1 | 9/2018 | Wang et al. | |
| 2019/0036584 A1 | 1/2019 | Chang et al. | |
| 2019/0045386 A1 | 2/2019 | Frenne et al. | |
| 2019/0074880 A1 | 3/2019 | Frenne et al. | |

OTHER PUBLICATIONS

LG Electronics: "Beamformed CSI-RS Related Enhancements based on the Identified Approaches", 3GPP Draft; R1-154274, 3rd Generation Partnership Project (3GPP), Mobile Competence Centre; 650, Route Des Lucioles; F-06921 Sophia-Antipolis Cedex; France, vol. RAN WG1, No. Beijing, China; 20150824-20150828 Aug. 23, 2015, XP051001605, Retrieved from the Internet: URL:http://www.3gpp.org/ftp/Meetings_3GPP_SYNC/RAN1/Docs/ [retrieved on Aug. 23, 2015], 7 pages.

* cited by examiner

TECHNIQUES FOR BEAM DISCOVERY AND BEAMFORMING IN WIRELESS COMMUNICATIONS

CROSS-REFERENCE TO RELATED APPLICATION

This application is a Continuation of application Ser. No. 15/915,755 entitled "TECHNIQUES FOR BEAM DISCOVERY AND BEAMFORMING IN WIRELESS COMMUNICATIONS," filed Mar. 8, 2018, which claims priority to U.S. Provisional Application Ser. No. 62/476,537, entitled "SIGNALING FOR CSI-RS WITH TIME VARYING CELL SPECIFIC BEAM TRAINING," filed on Mar. 24, 2017, which are expressly incorporated by reference herein in their entireties.

BACKGROUND

Aspects of the present disclosure relate generally to wireless communications systems, and more particularly, to techniques for beam discovery and beamforming in wireless communications (e.g., 5G New Radio).

Wireless communications systems are widely deployed to provide various telecommunication services such as telephony, video, data, messaging, and broadcasts. Typical wireless communications systems may employ multiple-access technologies capable of supporting communications with multiple users by sharing available system resources (e.g., time, frequency, power, and/or spectrum). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for increased data rates, higher capacity and reliability, and better cell coverage, new approaches may be desirable to improve beam discovery and beamforming, in order to satisfy consumer demand and improve user experience in wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a method related to signaling for channel state information reference signals (CSI-RS) in a wireless communications system is provided. In an aspect, the method may include receiving, by a user equipment (UE), a channel state information reference signal (CSI-RS) beam of a set of CSI-RS beams, and the CSI-RS beam includes a change indication message. The method may further include determining, by the UE, whether the set of CSI-RS beams has changed based on a value of the change indication message.

In another aspect, an apparatus for wireless communications is provided that includes a receiver, a memory configured to store instructions, and one or more processors communicatively coupled with the receiver and the memory. For example, the apparatus may include a receiver configured to receive a CSI-RS beam of a set of CSI-RS beams, and the CSI-RS beam may include a change indication message. The apparatus may also include a memory configured to store instructions, and at least one processor communicatively coupled with the receiver and the memory, and the at least one processor is configured to execute the instructions to determine whether the set of CSI-RS beams have changed based on a value of the change indication message.

In another aspect, an apparatus for wireless communication is provided that includes means for receiving a CSI-RS beam of a set of CSI-RS beams, the CSI-RS beam includes a change indication message, and means for determining whether the set of CSI-RS beams have changed based on a value of the change indication message.

In yet another aspect, a computer-readable medium (e.g., a non-transitory computer-readable medium) is provided. The computer-readable medium may store or comprise code, executable by at least one processor, to receive a CSI-RS beam of a set of CSI-RS beams and the CSI-RS beam includes a change indication message, and to determine whether the set of CSI-RS beams have changed based on a value of the change indication message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
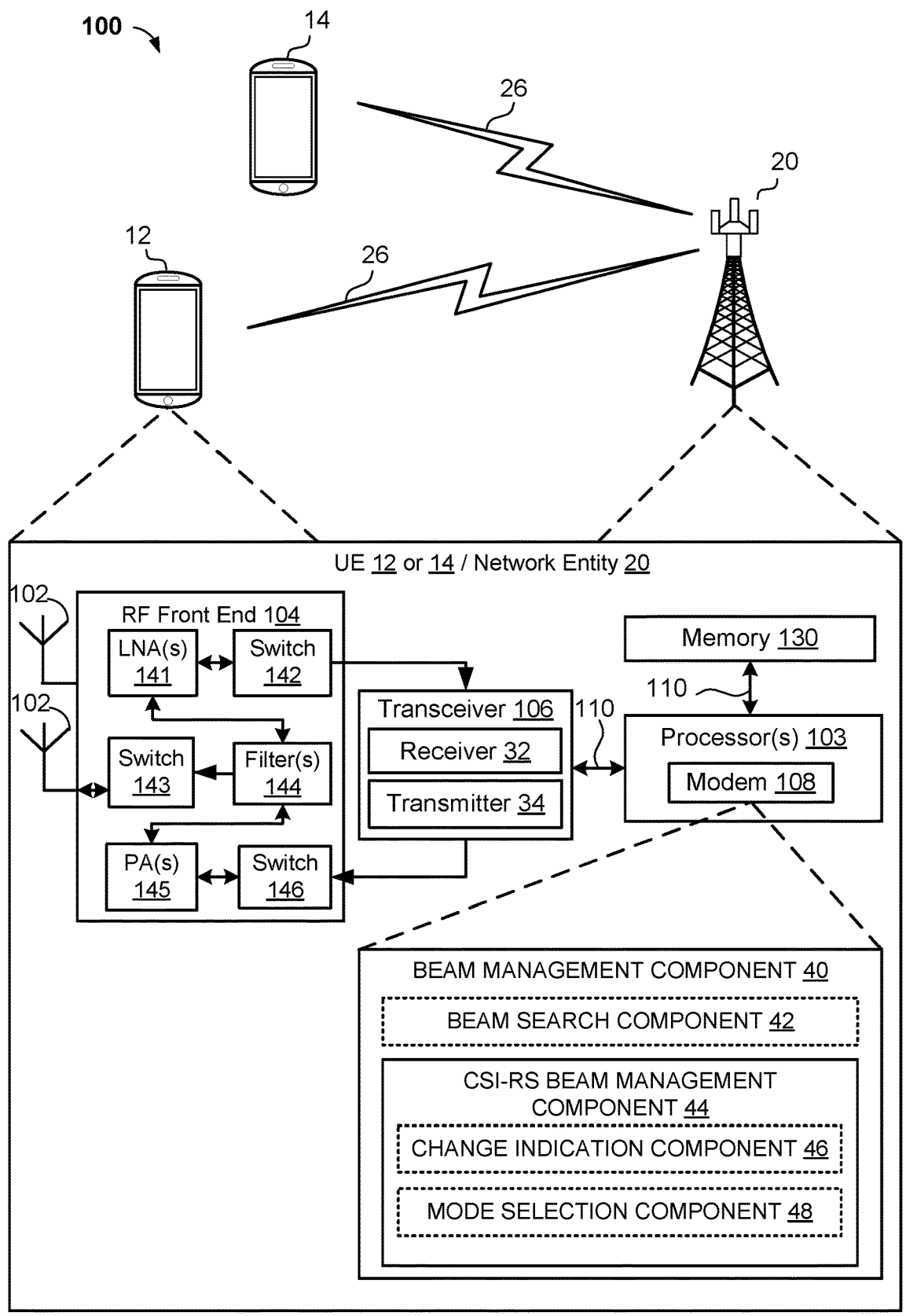
FIG. 1 is a block diagram of a first example of a wireless communications system including at least one network entity in communication with one or more user equipments (UEs) configured to perform signaling and management for channel state information reference signal (CSI-RS) beams, according to one or more of the presently described aspects.

In a wireless communications system (e.g., a millimeter wave (mmW) communications system), a user equipment (UE) may need to find a suitable beam from a periodic channel state information reference signals (CSI-RS) signal, which is sent from a base station and provides a beam sweep. A challenge is that the base station may insert or remove one or more beams from the beam sweep without notice to the UE. In some cases, the base station may also remap beams to different time and/or frequency resources. As such, a hierarchical beam search may be impossible or very difficult. Therefore, new approaches to improve beam discovery and beamforming may be desirable. In an aspect, an indicator, such as but not limited to a single bit, in the CSI-RS waveform may be used to indicate to the receiving UEs that the base station has modified a set of beams involved in the beam sweep. For example, the bit may be conveyed through a choice of a scrambling sequence customarily used for the CSI-RS. In some implementations, system performance may be improved by restricting the times at which the base station can execute a modification of the set of beams.

In some examples, a next generation NodeB (a gNodeB or a gNB) in a 5G NR system may provide the indication (e.g., a single-bit indication) to indicate one or more beam sweep changes, for example, through the choice of a scrambling sequence customarily used for the CSI-RS. In some aspects, the time durations at which the one or more changes in the CSI-RS beam sweep may be restricted to allow for a more robust beam discovery by the UE. In some cases, the indication may help to reduce the amount of time used by the beam search process. In some implementations, the UE in a mmW communications system is able to perform beam search based on the CSI-RS beam sweep, and the gNB may modify, insert, and/or delete one or more beam directions, and indicate the beam change(s) through the indication to the UE.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

In wireless communications systems (e.g., mmW communications systems), beamforming may be used to overcome high-path losses. In some aspects, both a base station (e.g., a gNB) and a user equipment (UE) may have to find and maintain suitable beams to enable a communication link between each other. For instance, for connected UEs, to find and maintain suitable beams, a procedure is typically involved that the base station (e.g., a gNB) periodically (or semi-persistently) sending a CSI-RS signal that contains a beam sweep over all relevant spatial directions. For example, a CSI-RS burst may include several orthogonal frequency division multiplexing (OFDM) symbols. For each OFDM symbol, in an aspect, the signals of several gNB beams pointing in different directions may be frequency multiplexed. In an aspect, gNB beams of different symbols may also point into different spatial directions. In some implementations, the base station (e.g., a gNB) may time division multiplexed (TDMed) or frequency division multiplexed (FDMed) the beams.

In an aspect, the transmission of a signal (e.g., an OFDM signal, or a CSI-RS) requires electric energy. To use the electric energy wisely, a beam sweep is typically restricted to those spatial directions that are relevant to the UEs (e.g., a limited number of UEs) in a cell. In an example, if there are only a few UEs in the cell, the beam sweep may consist of only a few gNB beams. In an aspect, the number of beams used during the sweep may grow or increase with the number of the UEs in the cell, in a condition that the beams are uniformly (or partial-uniform) spatially distributed. In an aspect, when the UEs may be found in all spatial directions, the beam sweep may contain the maximum number of beams. As such, a set of beams used during the beam sweep may change over time. For example, one or more UEs may enter or leave the cells at a certain time, therefore, one or more beams may be added or removed from the beam sweep. Additionally, the existing gNB beams may be reshuffled and/or reassigned to different time-frequency resources for the purpose of consolidating the gNB beams in a small number of symbols.

In some aspects, to discover new beams, the UE may apply a hierarchical search, which aims to find the strongest gNB beams first. In an example, the beam search may be conducted in parallel independently for several or all symbols of a CSI-RS. For example, in a first step, the UE may apply sequentially all of the antenna sub-arrays of the UE, employing an omnidirectional or pseudo-omnidirectional receive directivity pattern (e.g., a UE beam). The UE may determine the maximum Reference Signal Received Power (RSRP) over all frequency resources over all sub-arrays. In some examples, if the maximum RSRP is above a threshold, the UE may apply during the next iterations the best (or a better) antenna sub-array and may try out sequentially different directivity patterns (e.g., UE beams) pointing into different spatial directions. After the best pattern (e.g., a UE beam) has been found, a third round of iterations may be entered where sharper UE beams are applied.

In an aspect, due to analog beamforming, each iteration of the search algorithm may require the reception of a new CSI-RS burst with a different sub-array or a different UE beam. In some examples, the entire search may stretch over several CSI-RS bursts, and may only be successful when the UE has one or more indications indicate that the set of beams does not change during the search.

In another aspect, a gNB may communicate the change discussed herein (e.g., add or remove a UE beam or a gNB beam) to all the UEs. However, in mmW, a broadcast message is prohibitively expensive since the broadcast message may have to be transmitted in a beam-swept manner.

Described herein are various aspects related to a wireless communications system (e.g., an mmW system), in particular, signaling for CSI-RS with time varying cell-specific beam training. In an aspect, the waveform for each CSI-RS beam may convey a bit which is toggled by the gNB whenever the set of beams of CSI-RS changes. In an aspect, this bit may be called as a change indication bit. In an example, the change indication bit may determine the scrambling sequence of the beams. For example, when bit=0, the waveform of the beams is scrambled using a scrambling sequence A, otherwise a scrambling sequence B is used. In some examples, the sequence A and/or the sequence B may be used depending on a respective cell identification (ID) and/or a symbol number within a radio frame. Then, the UE may test upon reception of the CSI-RS for hypothesis A versus B through descrambling and channel estimation. In an aspect, the hypothesis with the higher likelihood yields the detected change indication bit.

In some aspects, the beam search may use a serving beam pair, which is used for accessing the system, since both the UE and the gNB may need to establish a beam. In an aspect, the serving beam pair may be maintained throughout the connection or a communication link. By evaluating a CSI-RS, the UE may discover alternate serving beam pairs as a fall back for the case that the serving beam fades away. Accordingly, in some examples, the UE may extract the change indication bit from the waveform of the serving beam or any of the alternate beams.

In some examples, while the change indication bit does not toggle, the UE may conduct a hierarchical beam search on all symbols of the CSI-RS burst. In an aspect, when the search algorithm investigates a symbol that contains the serving beam, the search algorithm may try out different sub-arrays or beams, and the serving beam may then not be received, hence the change indication bit may not be extracted from the serving beam. In an aspect, when one or more alternate serving beams are available on different symbols, the change indication bit may be extracted from the one or more alternate serving beams. Otherwise a stipulation may be needed that the gNB may not change the beam set arbitrarily fast or at arbitrary times. For example, a beam set may only be changed at the start of every fourth radio frame. In an aspect, a condition like the one discussed herein may introduce a protection interval during which the UE does not have to monitor the change indication bit and may try out different antenna sub-arrays/beams on the symbol that usually carries the serving beam. In some examples, the UE may use the protection interval to reduce the probability of misdetection of the change indication bit.

In some examples, when the change indication bit signifies a beam change while a hierarchical beam search is ongoing, a simple approach may include discarding the results of the search, and another approach is provided in FIG. 2 discussed later.

One or more of the aspects described above may be performed or implemented by the apparatus and methods described below in connection with FIGS. 1-4.

Referring to FIG. 1, in an aspect, a wireless communication system 100 includes at least one UE 12 or UE 14 in communication coverage of at least one network entity 20 (e.g., a base station or a gNB, or a cell thereof, in an mmW system or a 5G NR system). UE 12 and/or UE 14 may communicate with a network via the network entity 20. In some aspects, multiple UEs including UE 12 and/or UE 14 may be in communication coverage with one or more network entities, including network entity 20. In an aspect, the network entity 20 may be a base station such a gNB in a 5G NR network, and/or in an LTE network. Although various aspects are described in relation to the Universal Mobile Telecommunications System (UMTS), LTE, or 5G NR networks, similar principles may be applied in other wireless wide area networks (WWAN). The wireless network may employ a scheme where multiple base stations may transmit on a channel.

In some examples, UE 12 and/or UE 14 may transmit and/or receive wireless communications (e.g., beamforming) to and/or from network entity 20. For example, the UE 12 and/or UE 14 may be actively communicating with network entity 20. In some implementations, each of the UE 12 and/or UE 14 and network entity 20 (e.g., a gNB) may establish a beam, as such, a serving beam pair may be established between the UE 12, 14 and the network entity 20. In an aspect, the serving beam pair may be maintained throughout the connection or communication links 26. By evaluating a CSI-RS, the UE 12, 14 may discover alternate serving beam pairs as a fall back for the case that the serving beam fades away. Accordingly, in some examples, the UE may extract a change indication bit from a waveform of the serving beam and/or any of the alternate beams.

In some implementations, the network entity 20 may be an mmW base station or an mmW gNB, and may operate in mmW frequencies and/or near mmW frequencies. In some examples, extremely high frequency (EHF) may be part of the radio frequency (RF) in the electromagnetic spectrum. EHF has a range of 30 GHz to 300 GHz and a wavelength between 1 millimeter and 10 millimeters. Radio waves in the band/range may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band has extremely high path loss and a short range. The network entity 20 and/or the UE 12, 14 may utilize beamforming 26 to compensate for the extremely high path loss and short range.

In some aspects, UE 12 and/or UE 14 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 and/or UE 14 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things, or any other similar functioning device.

In some examples, the network entity 20 may be referred to as a base transceiver station, a radio base station, a radio transceiver, a basic service set (BSS), an extended service set (ESS), NodeB, eNodeB, Home NodeB, Home eNodeB, gNB, macrocell, picocell, femtocell, relay, small cell box, or some other suitable terminology. The coverage area for a base station may be divided into sectors making up only a portion of the coverage area (not shown). The wireless communications system 100 may include a network entity 20 of different types (e.g., macro, micro, and/or pico base stations). The network entity 20 may utilize different radio technologies, such as cellular and/or Wireless Local Area Network (WLAN) radio access technologies (RAT). The network entity 20 may be associated with the same or different access networks or operator deployments. The coverage areas of the network entity 20, including the coverage areas of the same or different types of the network entity 20, utilizing the same or different radio technologies, and/or belonging to the same or different access networks, may overlap. Furthermore, the network entity 20 may be substantially any type of component that may communicate with UE 12 and/or 14 to provide wireless network access at the UE 12 and/or 14.

According to the present aspects, the UE 12 and/or UE 14 may include one or more processors 103 and a memory 130 that may operate in combination with a beam management component 40 to control a beam search component 42, a CSI-RS beam management component 44 (and/or subcomponents of the CSI-RS beam management component 44 which may include a change indication component 46 and/or a mode selection component 48) for performing beamforming management, transmissions and/or receptions as described herein. The network entity 20 may include one or more processors 103 and a memory 130 that may operate in combination with a beam management component 40 to control a CSI-RS beam management component 44 (and/or one or more of the sub-components 46 and 48) for performing beamforming management, transmissions and/or receptions as described herein. In some examples, some of the components and/or sub-components are shown in dashed line boxes because some of the components and/or sub-components may be not part of the UE 12/UE 14 or the network entity 20 implementation (or may be optional), as applicable.

For example, the beam management component 40 may perform beamforming management, transmissions and/or receptions as described herein. In an aspect, the term "component" as used herein may be one of the parts that make up a system, may be hardware, firmware, and/or software, and may be divided into other components. The beam management component 40 may be communicatively coupled with a transceiver 106, which may include a receiver 32 for receiving and processing RF or beam signals and a transmitter 34 for processing and transmitting RF or beam signals. In some examples, the beam management component 40 may include the beam search component 42 and/or the CSI-RS beam management component 44 (and/or its sub-components) for performing CSI-RS signaling/beamforming with time varying cell-specific beam training. The processor 103 may be coupled with the transceiver 106 and memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, an RF receiver. In an aspect, the receiver 32 may monitor or receive beam signals transmitted by UE 12 and/or UE 14 or network entity 20. The receiver 32 may obtain measurements of or indications in the signals. For example, the receiver 32 may determine Ec/Io, SNR, etc.

The transmitter 34 may include hardware, firmware, and/or software code executable by a processor for beamforming and transmitting data, the code comprising instructions and being stored in a memory (e.g., computer-readable medium). The transmitter 34 may be, for example, an RF transmitter.

In an aspect, the one or more processors 103 can include a modem 108 that uses one or more modem processors. The various functions related to the beam management component 40 may be included in modem 108 and/or processors 103 and, in an aspect, can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in the beam management component 40, including the beam search component 42 and/or the CSI-RS beam management component 44 (and/or its sub-components).

The beam management component 40, the beam search component 42, and/or the CSI-RS beam management component 44 (and/or its sub-components) may include hardware, firmware, and/or software code executable by a processor for performing random access management and operations. For example, the hardware may include, for example, a hardware accelerator, or specialized processor.

Moreover, in an aspect, UE 12 and/or UE 14 and/or network entity 20 may include an RF front end 104 and a transceiver 106 for receiving and transmitting radio transmissions including beamforming, for example, communication links 26 (e.g., beam signals). In some examples, the communication links 26 may use spatial multiplexing, beamforming, transmit diversity, and/or a multiple-input multiple-output (MIMO) antenna technology. The communication links 26 may be through one or more carriers. In an example, transceiver 106 of network entity 20 may transmit or receive a signal, such as beam signals (e.g., a CSI-RS beam) or messages generated by beam management component 40, and/or including a pilot signal (e.g., common pilot channel (CPICH). The transceiver 106 of UE 12, 14 may measure the received beam signals (e.g., a CSI-RS beam) and/or pilot signals in order to determine signal quality and for providing feedback to the network entity 20.

RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 103.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the beam management component 40.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, RF front end 104 can use one or more switches 142, 143, 146 to select a transmit or receive path using a specified filter 144, LNA, 141, and/or PA 145, based on a configuration as specified by transceiver 106 and/or processor 103.

Transceiver 106 may be configured to transmit and receive wireless signals (e.g., beam signals) through one or more antennas 102 via RF front end 104. In an aspect, transceiver may be tuned to operate at specified frequencies such that UE 12 and/or UE 14 can communicate with, for example, network entity 20. In an aspect, for example, modem 108 may configure transceiver 106 to operate at a specified frequency and power level based on the UE configuration of the UE 12 and/or UE 14 and communication protocol used by modem 108.

In an aspect, modem 108 can be a multiband-multimode modem, which can process digital data and communicate with transceiver 106 such that the digital data is sent and received using transceiver 106. In an aspect, modem 108 can be multiband and be configured to support multiple frequency bands for a specific communications protocol. In an aspect, modem 108 can be multimode and be configured to support multiple operating networks and communications protocols. In an aspect, modem 108 can control one or more components of UE 12 and/or UE 14 or network entity 20 (e.g., RF front end 104, transceiver 106) to enable transmission and/or reception of signals based on a specified modem configuration. In an aspect, the modem configuration can be based on the mode of the modem and the frequency band in use. In another aspect, the modem configuration can be based on UE configuration information associated with UE 12 and/or UE 14 as provided by the network during cell selection and/or cell reselection.

UE 12 and/or UE 14, or network entity 20 may further include memory 130, such as for storing data used herein and/or local versions of applications or beam management component 40 and/or one or more of its subcomponents being executed by processor 103. Memory 130 may include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 130 may be a computer-readable storage medium that stores one or more computer-executable codes defining beam management component 40 and/or one or more of its subcomponents, and/or data associated therewith, when UE 12 and/or UE 14 and/or network entity 20 is operating processor 103 to execute beam management component 40 and/or one or more of its subcomponents. In another aspect, for example, memory 130 may be a non-transitory computer-readable storage medium.

Figure 2:
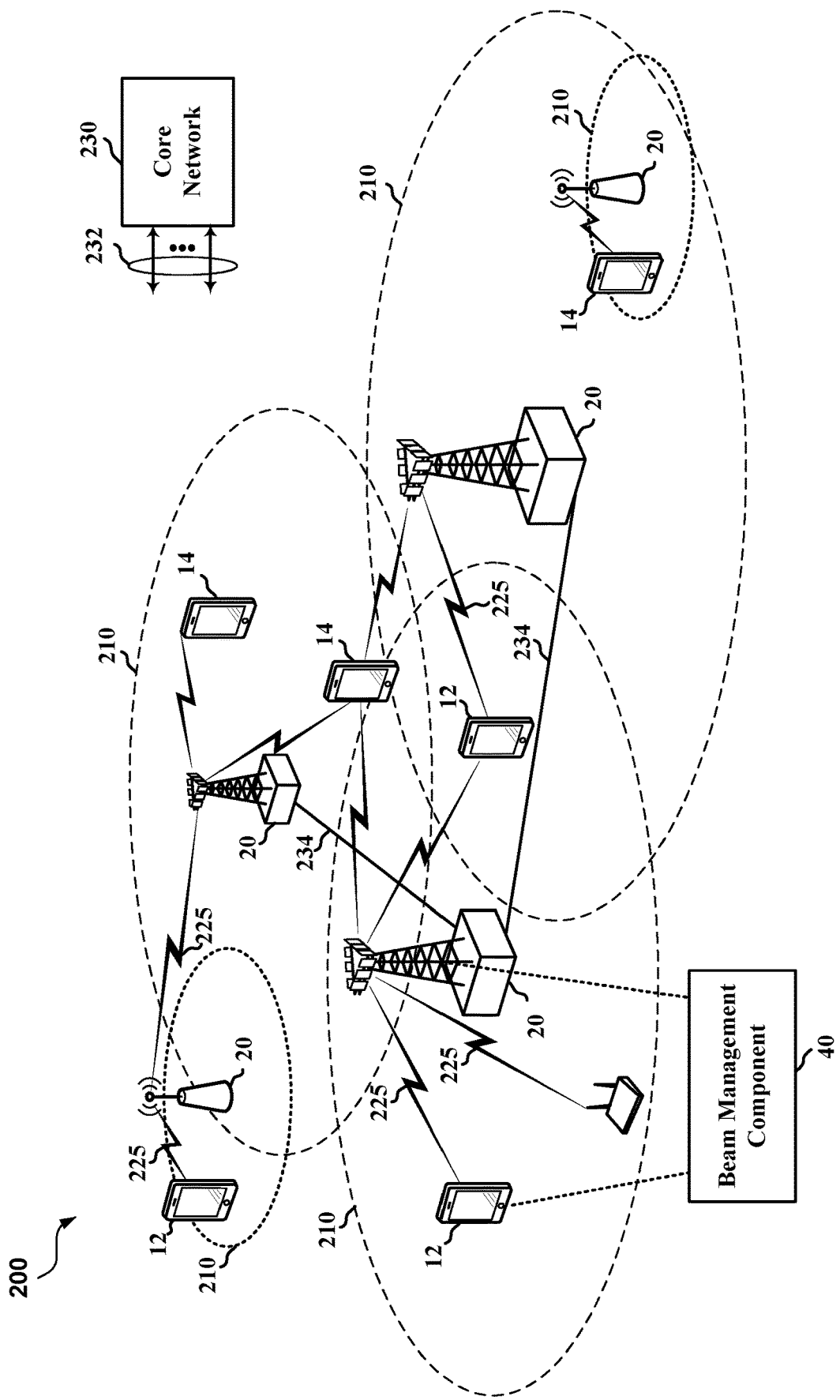
FIG. 2 is a block diagram of a second example of a wireless communications system including multiple UEs for communicating with one or more network entities to perform signaling and management for CSI-RS beams, according to one or more of the presently described aspects.

Referring to FIG. 2, a diagram illustrates an example of a wireless communications system 200, in accordance with aspects described herein. In some examples, the wireless communications system 200 may be the same as or include the wireless communications system 100 in FIG. 1, and may include a plurality of network entities 20 (e.g., base stations, gNBs, or WLAN network entities), a number of UEs 12 and/or 14, and one or more core networks 230. In an aspect, one or more UEs 12 and/or 14 may include a beam management component 40 configured to perform beamforming management, transmissions and/or receptions as described herein. The beam management component 40 may be configured to perform at least some aspects of the techniques or methods described above in wireless communications, including LTE or 5G NR. Some of the network entity 20 may communicate with the UEs 12 and/or 14 under the control of a base station controller (not shown), which may be part of the core network 230 or the network entity 20 (e.g., a base station or a gNB) in various examples.

In an aspect, the network entity 20 may communicate control or system information and/or user data with the core network 230 through backhaul links 232. In some cases, the network entity 20 may communicate, either directly or indirectly, with each other over backhaul links 234, which may be wired or wireless communication links. The wireless communications system 200 may support operation on multiple carriers (waveform signals of different frequencies). Multi-carrier transmitters may transmit modulated signals simultaneously on the multiple carriers. For example, each communication link 225 (e.g., wireless communications 26 in FIG. 1) may be a multi-carrier signal modulated according to the various radio technologies described above. Each modulated signal or beam may be sent on a same or different carrier and may carry control or system information (e.g., reference signals, control channels, etc.), overhead information, data, etc.

In some examples, the network entity 20 may wirelessly communicate with the UEs 12 and/or 14 via one or more antennas. Each of the network entity 20 may provide communication coverage for a respective coverage area 210. In some examples, the network entity 20 may be referred to as a base station, a NodeB, an eNodeB, a Home NodeB, a Home eNodeB, a gNB, or an access point. In some cases, at least a portion of the wireless communications system 200 may be configured to operate on a spatial multiplexing (e.g., multiple-input and multiple-output (MIMO)) scheme in which one or more of the UEs 12 and/or 14 and one or more of the network entity 20 may be configured to support transmissions on closed-loop MIMO and/or open-loop MIMO scheme.

In network communication systems using LTE/LTE-A, 5G NR, or similar communication technologies, the terms eNodeB, eNB or gNB may be used to describe the network entity 20, though concepts described herein may be applied to other types of network entity in other types of communication technologies. For example, the wireless communications system 200 may be an LTE or a 5G NR network in which different types of network entity provide coverage for various geographical regions. For example, each network entity 20 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 12 and/or 14 with service subscriptions with the network provider. A small cell may cover a relatively smaller geographic area and may allow unrestricted access by UEs 12 and/or 14 with service subscriptions with the network provider, for example, and in addition to unrestricted access, may also provide restricted access by UEs 12 and/or 14 having an association with the small cell (e.g., UEs in a closed subscriber group (CSG), UEs for users in the home, and the like). A base station for a macro cell may be referred to as a macro base station. A base station for a small cell may be referred to as a small cell base station. A base station may support one or multiple (e.g., two, three, four, and the like) cells.

In some aspects, the core network 230 may communicate with the base stations or other network entity 20 via one or more backhaul links 232 (e.g., S1 interface, etc.). The network entity 20 may also communicate with one another, e.g., directly or indirectly via backhaul links 234 (e.g., X2 interface, etc.) and/or via backhaul links 232 (e.g., through core network 230).

In some examples, the UEs 12 and/or 14 may be dispersed throughout the wireless communications system 200, and each UE 12 or 14 may be stationary or mobile. The UE 12 or 14 may be referred to by those skilled in the art as a suitable terminology discussed herein. The UE 12 or 14 may be able to communicate with macro base stations, small cell base stations, relays, and the like. The UE 12 or 14 may be able to communicate over different access networks, such as cellular or other WWAN access networks, or WLAN access networks.

The communication links 225 (e.g., wireless communications 26 in FIG. 1) shown in wireless communications system 200 may include uplink transmissions from the UE 12 or 14 to the network entity 20, and/or downlink transmissions (e.g., one or more CSI-RS beams) from the network entity 20 to the UE 12 or 14. The downlink transmissions may also be called forward link transmissions while the uplink transmissions may also be called reverse link transmissions. The communication links 225 may carry transmissions of each hierarchical layer which, in some examples, may be multiplexed in the communication links 225. The UEs 12 and/or 14 may be configured to collaboratively communicate with multiple network entity 20 through, for example, MIMO, carrier aggregation (CA), Coordinated Multi-Point (CoMP), or other schemes. MIMO techniques use multiple antennas on the network entity 20 and/or multiple antennas on the UE 12 or 14 to transmit multiple data streams. The MIMO techniques may include closed-loop MIMO and/or open-loop MIMO scheme. Carrier aggregation (CA) may utilize two or more component carriers (CCs) on a same or different serving cell for data transmission. CoMP may include techniques for coordination of transmission and reception by a number of network entity 20 to improve overall transmission quality for UEs 12 and/or 14 as well as increasing network and spectrum utilization.

Figure 3:
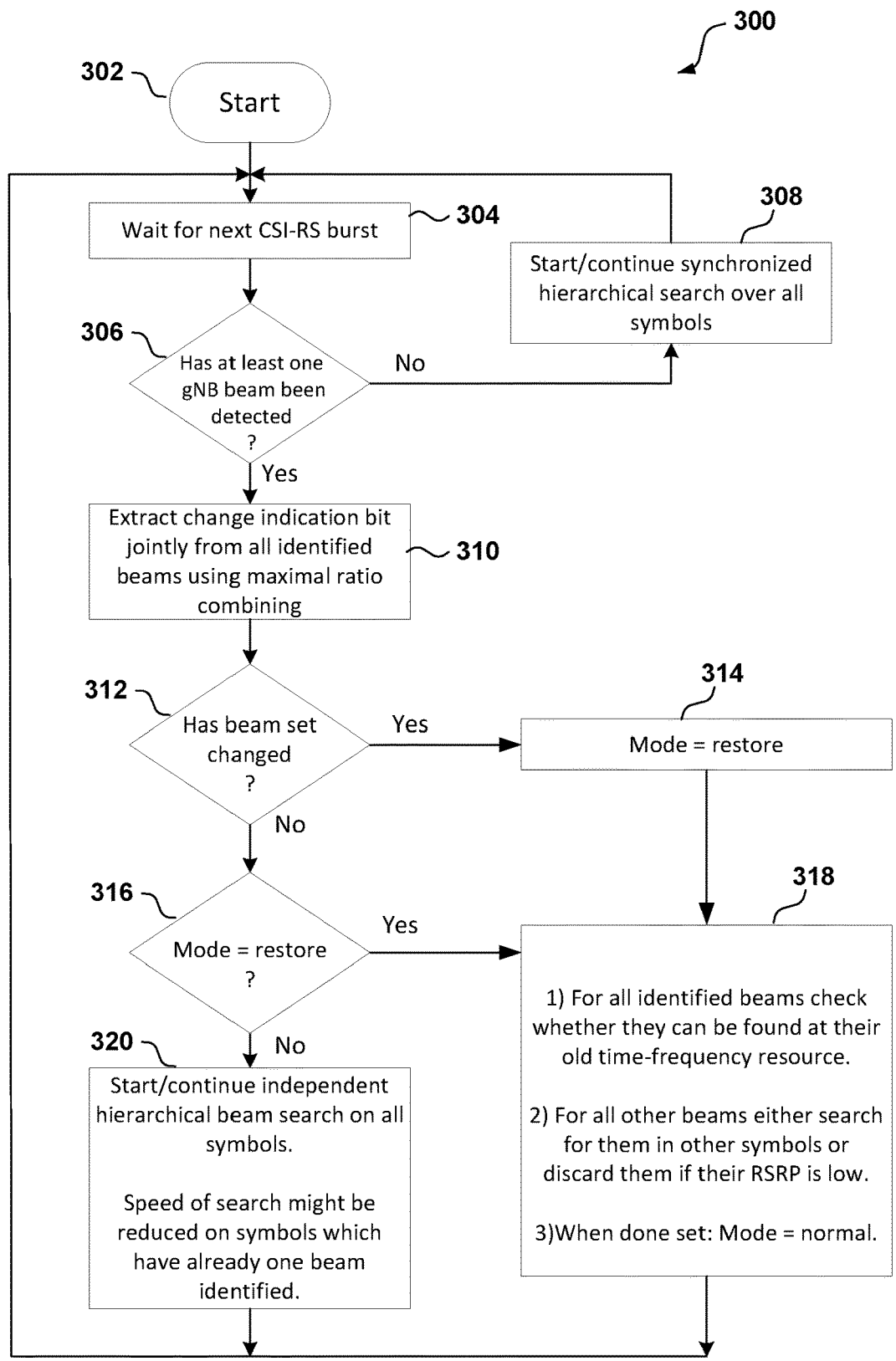
FIG. 3 is a flow chart for beam discovery and processing for CSI-RS beams, according to one or more of the presently described aspects.

Referring to FIG. 3, in an aspect, a flow chart outlines a beam discovery scheme 300 executable by, for example, UE 12 (or UE 14) for CSI-RS (e.g., periodic CSI-RS) discovery with a cell-specific time varying beam sweep, including a potential procedure labeled as a restore mode for salvaging information from one or more identified beams once the UE 12 has determined that the beam set has changed.

In an aspect, after the UE 12 initially establishes communication with the network entity 20, the UE 12 may have knowledge of at least a serving beam. As such, the beam discovery scheme 300 starts at block 302 with the UE 12 waiting for a next CSI-RS burst at block 304. For example, in an aspect, the beam search component 42, e.g., in conjunction with one or more of the processors 103, the memory 130, the modem 108, and/or the transceiver 106, may be configured to wait for a CSI-RS burst, or monitor beam signals for a CSI-RS burst transmitted by the network entity 20.

In an aspect, at block 306, upon the next CSI-RS burst, the UE 12 determines whether at least one beam from the network entity 20 has been detected. In an aspect, for example, the beam search component 42, CSI-RS beam management component 44, e.g., in conjunction with one or more of the processors 103, the memory 130, the modem 108, and/or the transceiver 106, may be configured to detect and receive one or more CSI-RS beams of a set of CSI-RS beams from the network entity 20 (e.g., a gNB).

In one alternative, if no beam from the network entity 20 has been detected, at block 308, the UE 12 may start or continue a synchronized hierarchical search over all symbols. In an aspect, for example, the beam search component 42, e.g., in conjunction with one or more of the processors 103, the memory 130, the modem 108, and/or the transceiver 106, may be configured to start or continue a synchronized hierarchical search. The details of this alternative are described below with reference to the "no" option stemming from block 306 that triggers the actions at block 308.

In another alternative, if at least one beam from the network entity 20 has been detected at block 308, then, at block 310, the UE 12 may extract a change indication bit to see if the beam set has changed. For example, the UE 12 may jointly extract the change indication bit from all identified beams using maximal ration combining. In an aspect, for example, the CSI-RS beam management component 44, and/or change indication component 46, e.g., in conjunction with one or more of the processors 103, the memory 130, the modem 108, and/or the transceiver 106, may be configured to determine whether the CSI-RS beam includes a change indication message (e.g., in or via a change indication bit). If a change indication message is found or detected, the CSI-RS beam management component 44, and/or change indication component 46 may extract the change indication message or bit.

Then, after extracting the change indication bit, at block 312, the UE 12 determines whether the beam set has changed. For example, the UE identifies the value of the change indication bit (e.g., "1" or "0") in order to determine whether the bit indicates a change or no change. In an aspect, for example, the change indication component 46 may be configured to determine whether the set of CSI-RS beams have changed based on the value of the change indication (e.g., a change indication bit="1" or "0"). In some cases, the change of the set of CSI-RS beams may be that a beam or beams in the set of CSI-RS beams have been added or removed by the network entity 20.

In one alternative, if the beam set has not changed, at block 316, the UE 12 may determine whether the UE 12 is in a restore mode. In an aspect, for example, the mode selection component 48 may be configured to determine whether the UE 12 is in a restore mode. In an example, if the processing related to a prior restore mode was not completed before a time threshold to end the restore mode operations, or if a timing for a next CSI-RS burst has arrived, the UE 12 (e.g., via the mode selection component 48) may have partially performed the restore mode operations and may determine to return to finish the restore mode at block 318. This alternative related to block 318 will be discussed in more detail below.

In the other alternative, if the UE 12 determines that it is not in the restore mode, then at block 320, the UE 12 may start or continue an independent hierarchical beam search on all symbols. In an aspect, for example, the mode selection component 48 may be configured to determine whether the UE 12 is in a restore mode, and if not, the beam search component 42 may be configured to start or continue an independent hierarchical beam search on all symbols. In an implementation, the speed of the search might be reduced on symbols which have already one beam identified. Once completed or once a time threshold has been reached, the UE 12 may return to the beginning of the beam discovery scheme 300 to wait for the next CSI-RS (e.g., at block 304) and repeat the process.

Alternatively, if the UE 12 determines that the beam set has changed (at block 312), or if the UE 12 has determined that it was in the restore mode (at block 316), the UE 12 may respectively start a new restore mode at block 314, or continue a pending restore mode where it left off (at block 318). In an aspect, for example, the beam management component 40 and/or mode selection component 48 may be configured to start a new restore mode or continue a pending restore mode as shown in FIG. 3.

In some aspects of a restore mode, at block 318, the UE 12 (e.g., via the beam management component 40, beam search component 42, CSI-RS beam management component 44, and/or mode selection component 48) may attempt to find the time-frequency locations of one or more previously identified beams (e.g., most or all of the previously identified beams), which is independent from a determination of whether the best UE beam has been found. As such, most of the prior efforts for the time-frequency locations discovery may be salvaged. In some examples, the UE 12 may first test which of the beams still show up in their usual symbol. For the beams that cannot be found in their usual symbol, the UE 12 may search other symbols during future CSI-RS bursts. For the search, the beams may be ordered in descending RSRP. In some examples, the UE 12 may require an entire CSI-RS burst per beam. During the burst, the UE 12 may apply the same beam specific sub-array or directivity pattern for all CSI-RS symbols, and the UE 12 may identify or determine which symbol the RSRP is the highest, excluding the time-frequency resources of the beams that has already been processed. As such, excluding the time-frequency resources of the beams that has already been processed will be successful provided that the beam is still in the set. In contrast, if not excluding the time-frequency resources of the beams that has already been processed, the search may not provide a useful result, and the UE 12 may discard the beam. In an example, the entire search may be terminated early, because the UE 12 may consider that it is not worth to delay any longer the resumption of beam monitoring and the ordinary hierarchical search. In this case, the mode may be set back to normal.

Returning to the alternative stemming from block 306 where no beam from the network entity 20 has been detected, in an example, there may be a situation that all serving beams are lost. In this case, referring to block 308, a hierarchical search may be conducted, where the UE 12 may always use the same sub-array and the UE beam for all CSI-RS symbols of the burst (e.g., a synchronous hierarchical search). In some examples, a hierarchical search may work as long as the beam (that the UE hunts for) stays within the beam set. In an aspect, the beam may change the time-frequency resource on which the beam is transmitted, but this change may not influence the performance of the synchronous search. If, however, the network entity 20 happens to remove the beam during the search, the search may end with any useful result. The beam removal, however, may typically not happen, as the network entity 20 sends all beams required for any of the UEs in the cell. In any case, for example, the UE 12 may start a new search (e.g., via the beam management component 40, and/or beam search component 42).

It should be noted that, for purposes of simplicity of explanation, the schemes and methods discussed herein are shown and described as a series of acts, and it is to be understood and appreciated that the scheme and method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Figure 4:
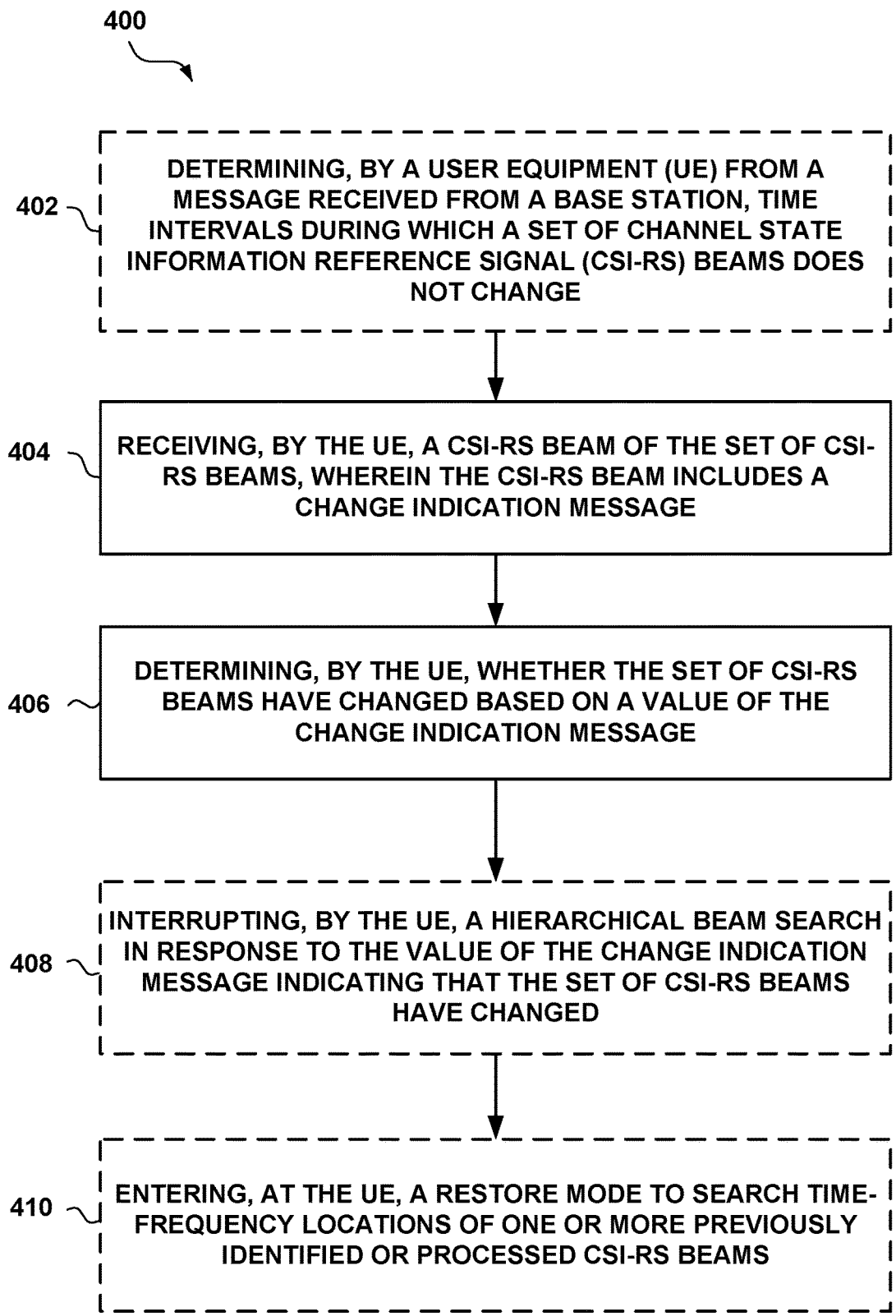
FIG. 4 is a flow diagram of an example method of signaling and processing for CSI-RS beams, according to one or more of the presently described aspects.

Referring to FIG. 4, in an operational aspect, a UE such as UE 12 and/or UE 14 (FIG. 1) may perform one or more aspects of a method 400 for CSI-RS beamforming. For example, one or more of the processors 103, the memory 130, modem 108, transceiver 106, beam management component 40, beam search component 42, CSI-RS beam management component 44, change indication component 46, and/or mode selection component 48, may be configured to perform one or more aspects of the method 400.

In an aspect, at block 402, the method 400 may include determining, by the UE from a message received from a base station, time intervals during which the set of CSI-RS beams does not change. In an aspect, for example, the beam management component 40, the CSI-RS beam management component 44, the change indication component 46, e.g., in conjunction with one or more of the processors 103, the memory 130, the modem 108, and/or the transceiver 106, may be configured to determine a time interval during which the UE does not determine whether the CSI-RS beam includes the change indication. In an example, the UE may be configured to determine a protection interval during which the UE 12 or 14 does not have to monitor a change indication message or bit, and may try out different antenna sub-arrays or beams on the symbol that may carry a serving beam. In some examples, the UE may use the protection interval to reduce the probability of misdetection of the change indication bit.

In an aspect, at block 404, the method 400 may include receiving, by a user equipment (UE), a channel state information reference signal (CSI-RS) beam of a set of CSI-RS beams, wherein the CSI-RS beam includes a change indication message. In an aspect, for example, the beam management component 40, the CSI-RS beam management component 44, e.g., in conjunction with one or more of the processors 103, the memory 130, the modem 108, and/or the transceiver 106, may be configured to receive one or more CSI-RS beams of a set of CSI-RS beams.

In an aspect, at block 406, the method 400 may include determining, by the UE, whether the set of CSI-RS beams have changed based on a value of the change indication message. In an aspect, for example, the CSI-RS beam management component 44 and/or the change indication component 46 (FIG. 1), e.g., in conjunction with one or more of the processors 103, the memory 130, the modem 108, and/or the transceiver 106, may be configured to determine whether the CSI-RS beam includes a change indication message (e.g., in or via a change indication bit), and the change indication may indicate whether the set of CSI-RS beams have changed (e.g., a beam or beams in the set of CSI-RS beams have been added or removed by the network entity 20). For example, the UE may be configured to determine whether the set of CSI-RS beams have changed based on a value of the change indication (e.g., a change indication bit="0" or "1"), as described herein.

In an aspect, at block 408, the method 400 may include interrupting, by the UE, a hierarchical beam search in response to the value of the change indication message indicating that the set of CSI-RS beams have changed. In an aspect, for example, the beam search component 42, the CSI-RS beam management component 44, the change indication component 46, e.g., in conjunction with one or more of the processors 103, the memory 130, the modem 108, and/or the transceiver 106, may be configured to interrupt the hierarchical beam search in response to the value of the change indication message indicating that the set of CSI-RS beams have changed, as described herein.

In an aspect, at block 410, the method 400 may include entering, at the UE, a restore mode to search time-frequency locations of one or more previously identified or processed CSI-RS beams. In an aspect, for example, the CSI-RS beam management component 44, the mode selection component 48, e.g., in conjunction with one or more of the processors 103, the memory 130, the modem 108, and/or the transceiver 106, may be configured to enter a restore mode to search time-frequency locations of one or more previously identified or processed CSI-RS beams, as described herein.

In another aspect, the method 400 may optionally include conducting a hierarchical beam search on all symbols associated with the CSI-RS beam. In an aspect, for example, the beam search component 42, the CSI-RS beam management component 44, e.g., in conjunction with one or more of the processors 103, the memory 130, the modem 108, and/or the transceiver 106, may be configured to conduct one or more hierarchical beam search on at least a portion or all of the symbols associated with the CSI-RS beam or burst, as described herein. In some examples, the hierarchical beam search may be used to find a symbol that contains a serving beam, or to find one or more different symbols that include one or more alternate serving beams, and the change indication may be extracted from one or more of the serving beams.

Several aspects of a telecommunications system have been presented with reference to an LTE/LTE-A or a 5G communication system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one"

unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Moreover, nothing disclosed herein is intended to be dedicated to the public regardless of whether such disclosure is explicitly recited in the claims.

What is claimed is:

1. A method of wireless communications, comprising:
receiving, by a user equipment (UE), a channel state information reference signal (CSI-RS) beam of a set of CSI-RS beams, wherein the CSI-RS beam includes a change indication message;
extracting, by the UE, the change indication message from the CSI-RS beam; and
determining, by the UE, whether the set of CSI-RS beams has changed based on a value of the change indication message.

2. The method of claim 1, wherein the change indication message is a one bit indication with a first value indicating a change to the set of CSI-RS beams and a second value indicating no change to the set of CSI-RS beams, wherein a change comprises at least one of one or more beams added to the set of CSI-RS beams or one or more beams removed from the set of CSI-RS beams.

3. The method of claim 1, further comprising conducting, by the UE, a hierarchical beam search on all symbols of a CSI-RS burst using all antenna sub-arrays sequentially during a first iteration.

4. The method of claim 3, further comprising conducting, by the UE, a hierarchical beam search of a subsequent CSI-RS burst using an antenna sub-array during a second iteration.

5. The method of claim 3, further comprising:
determining, by the UE, a maximum reference signal received power (RSRP) over all frequency resources over all antenna sub-arrays; and
conducting, by the UE, a hierarchical beam search of a subsequent CSI-RS burst using the antenna sub-array having a maximum RSRP being above a predetermined threshold and using sequentially different directivity beams pointed in different spatial directions in a second iteration to determine the best pattern.

6. The method of claim 1, wherein in response to determining the set of CSI-RS beams has not changed, the method further comprises:
determining, by the UE, whether the UE is in a restore mode; and
finishing, by the UE, the restore mode in response to the UE being in the restore mode and a time threshold for the restore mode not being reached.

7. The method of claim 6, wherein finishing the restore mode comprises searching, by the UE, for one or more previously identified CSI-RS beams.

8. The method of claim 7, wherein finishing the restore mode further comprises determining, by the UE, which symbol reference signal received power (RSRP) is highest.

9. The method of claim 1, wherein in response to determining the set of CSI-RS beams has not changed, the method further comprises:
determining, by the UE, whether the UE is in a restore mode; and
conducting, by the UE, a hierarchical beam search on all symbols of a CSI-RS burst in response to the UE not being in the restore mode.

10. The method of claim 1, wherein extracting the change indication message from the CSI-RS beam comprises jointly extracting a change indication message from all identified beams using maximal ration combining.

11. An apparatus for wireless communications, comprising:
a receiver configured to receive a channel state information reference signal (CSI-RS) beam of a set of CSI-RS beams, wherein the CSI-RS beam includes a change indication message;
a memory configured to store instructions; and
at least one processor communicatively coupled with the receiver and the memory, wherein the at least one processor is configured to execute the instructions to:
extract the change indication message from the CSI-RS beam; and
determine whether the set of CSI-RS beams has changed based on a value of the change indication message.

12. The apparatus of claim 11, wherein the change indication message is a one bit indication with a first value indicating a change to the set of CSI-RS beams and a second value indicating no change to the set of CSI-RS beams, wherein a change comprises at least one of one or more beams added to the set of CSI-RS beams or one or more beams removed from the set of CSI-RS beams.

13. The apparatus of claim 11, wherein the at least one processor is configured to execute further instructions to conduct a hierarchical beam search on all symbols of a CSI-RS burst using all antenna sub-arrays sequentially during a first iteration.

14. The apparatus of claim 13, wherein the at least one processor is configured to execute further instructions to conduct a hierarchical beam search of a subsequent CSI-RS burst using an antenna sub-array during a second iteration.

15. The apparatus of claim 13, wherein the at least one processor is configured to execute further instructions to:
determine a maximum reference signal received power (RSRP) over all frequency resources over all antenna sub-arrays; and
conduct a hierarchical beam search of a subsequent CSI-RS burst using the antenna sub-array having a maximum RSRP being above a predetermined threshold and using sequentially different directivity beams pointed in different spatial directions in a second iteration to determine the best pattern.

16. The apparatus of claim 11, wherein in response to determining the set of CSI-RS beams has not changed, the at least one processor is configured to execute further instructions to:
determine whether the apparatus is in a restore mode; and
finish the restore mode in response to the apparatus being in the restore mode and a time threshold for the restore mode not being reached.

17. The apparatus of claim 16, wherein finishing the restore mode comprises searching for one or more previously identified CSI-RS beams.

18. The apparatus of claim 17, wherein finishing the restore mode further comprises determining which symbol reference signal received power (RSRP) is highest.

19. The apparatus of claim 11, wherein in response to determining the set of CSI-RS beams has not changed, the at least one processor is configured to execute further instructions to:
determine whether the apparatus is in a restore mode; and
conduct a hierarchical beam search on all symbols of a CSI-RS burst in response to the apparatus not being in the restore mode.

20. The apparatus of claim 11, wherein extracting the change indication message from the CSI-RS beam comprises:
jointly extracting a change indication message from all identified beams using maximal ration combining.

21. A non-transitory computer-readable medium comprising code executable by at least one processor of an apparatus to:
receive a channel state information reference signal (CSI-RS) beam of a set of CSI-RS beams, wherein the CSI-RS beam includes a change indication message;
extract the change indication message from the CSI-RS beam; and
determine whether the set of CSI-RS beams has changed based on a value of the change indication message.

22. The non-transitory computer-readable medium of claim 21, wherein the change indication message is a one bit indication with a first value indicating a change to the set of CSI-RS beams and a second value indicating no change to the set of CSI-RS beams, wherein a change comprises at least one of one or more beams added to the set of CSI-RS beams or one or more beams removed from the set of CSI-RS beams.

23. The non-transitory computer-readable medium of claim 21, further comprising code executable by the at least one processor to conduct a hierarchical beam search on all symbols of a CSI-RS burst using all antenna sub-arrays sequentially during a first iteration.

24. The non-transitory computer-readable medium of claim 23, further comprising code executable by the at least one processor to conduct a hierarchical beam search of a subsequent CSI-RS burst using an antenna sub-array during a second iteration.

25. The non-transitory computer-readable medium of claim 23, further comprising code executable by the at least one processor to:
determine a maximum reference signal received power (RSRP) over all frequency resources over all antenna sub-arrays; and
conduct a hierarchical beam search of a subsequent CSI-RS burst using the antenna sub-array having a maximum RSRP being above a predetermined threshold and using sequentially different directivity beams pointed in different spatial directions in a second iteration to determine the best pattern.

26. The non-transitory computer-readable medium of claim 21, wherein in response to determining the set of CSI-RS beams has not changed, the code executable by the at least one processor further comprises code to:
determine whether the apparatus is in a restore mode; and
finish the restore mode in response to the apparatus being in the restore mode and a time threshold for the restore mode not being reached.

27. The non-transitory computer-readable medium of claim 26, wherein finishing the restore mode comprises searching for one or more previously identified CSI-RS beams.

28. The non-transitory computer-readable medium of claim 27, wherein finishing the restore mode further comprises determining which symbol reference signal received power (RSRP) is highest.

29. The non-transitory computer-readable medium of claim 21, wherein in response to determining the set of CSI-RS beams has not changed, the code executable by the at least one processor further comprises code to:
determine whether the apparatus is in a restore mode; and
conduct a hierarchical beam search on all symbols of a CSI-RS burst in response to the apparatus not being in the restore mode.

30. The non-transitory computer-readable medium of claim 21, wherein extracting the change indication message from the CSI-RS beam comprises jointly extracting a change indication message from all identified beams using maximal ration combining.

* * * * *